US005892890A

United States Patent [19]

Clouthier et al.

[11] Patent Number: 5,892,890

[45] Date of Patent: Apr. 6, 1999

[54] COMPUTER SYSTEM WITH PARALLEL PROCESSOR FOR PIXEL ARITHMETIC

[75] Inventors: Scott C. Clouthier, Boise; Douglas Heins, Burley, both of Id.

[73] Assignee: Hewlett-Packard Company, Palo Alto, Calif.

[21] Appl. No.: 877,349

[22] Filed: Jun. 17, 1997

[51] Int. Cl.[6] ............................ G06T 15/00; G05B 11/00

[52] U.S. Cl. .......................... 395/104; 395/106; 395/109; 395/115; 395/116; 395/182.01; 395/182.03; 395/651; 395/653; 395/800.01; 395/800.11; 395/800.16; 395/800.17; 395/800.21; 395/553; 395/162; 395/132; 364/131; 364/133; 364/134; 364/716.05

[58] Field of Search ..................................... 395/109, 106, 395/115, 116, 651, 653, 182.01, 182.03, 800.01, 800.11, 800.16, 800.17, 800.21; 364/131, 133, 134, 716.05

[56] References Cited

U.S. PATENT DOCUMENTS

| | | | |
|---|---|---|---|
| 4,918,624 | 4/1990 | Moore et al. | 364/519 |
| 5,146,547 | 9/1992 | Beck et al. | 395/116 |
| 5,157,765 | 10/1992 | Birk et al. | 395/163 |
| 5,202,670 | 4/1993 | Oha | 340/728 |
| 5,253,335 | 10/1993 | Mochizuki et al. | 395/122 |
| 5,317,679 | 5/1994 | Ueda et al. | 395/132 |
| 5,463,728 | 10/1995 | Blahut et al. | 395/158 |
| 5,533,185 | 7/1996 | Lentz et al. | 395/162 |
| 5,809,288 | 9/1998 | Balmer | 395/553 |
| 5,829,054 | 10/1998 | Ehlig et al. | 711/202 |

*Primary Examiner*—Scott Rogers
*Assistant Examiner*—Douglas Tran

[57] ABSTRACT

A pixel processor, for use in conjunction with a color video monitor or an all points addressable color print engine, includes brush logic, mask logic, clip logic, and a multi-pixel logic unit to produce a page map consisting of millions of pixels, each having a color value. To portray a 2D-rasterization of overlapping objects with portions of objects being transparent, and objects shaded with colored pattern, the processor combines source S, brush T, pattern mask, source mask, and prior destination D data. Brush logic combines an RGB color setting with a pattern to provide the brush data, tiled within a source region. Mask logic ensures transparency of portions of the pattern or source as defined by pattern mask data and source mask data, respectively. Clip logic limits pixel updates in regions of the page map not within the source region. The processor includes dynamically reconfigurable bit-slice architecture, for updating multiple pixels in parallel, for example four 8-bit pixels in one color plane per operation in a 32-bit embodiment. Registers hold intermediate results of arithmetic comparisons permitting a single raster operation such as S^((S^T) & (T^D)) to be performed in four clock periods. The symbol "^" represents a function that returns the absolute value of the difference of the operands. The symbol "&" represents a function that returns the arithmetic "minimum" of, in this case, intermediate results.

20 Claims, 5 Drawing Sheets

COMPUTER SYSTEM WITH PARALLEL PROCESSOR FOR PIXEL ARITHMETIC

FIELD OF THE INVENTION

Embodiments of the present invention relate to all-points-addressable displays and printers and to systems that quickly compute pixel intensity values.

BACKGROUND OF THE INVENTION

As an introduction to problems solved by the present invention, consider the conventional computer system having a laser printer, ink jet printer, or video monitor. In such a system, the page to be printed or the screen to be displayed is represented in memory as an intensity value for each picture element, called a pixel. Conventional pixel intensity values are in the range from 0 to 255 for one primary color. The entire array of pixels for a complete page or a complete screen is called a page map. Conventional color systems employ three color planes in one page map, each color plane for a primary color: red, green, or blue. With the introduction of low cost color printers, market demand has grown for printers that can quickly print whatever image is displayed on the display screen.

Images conventionally presented on a display screen originate from multiple programs operating concurrently. The image to be displayed is often a composite of overlapping regions, each region possibly originating from an independent program. Such regions overlap each other to obscure what is below when opaque and to shadow or show what is below when transparent. Within a region, areas may overlap, be opaque against a background pattern, or be transparent. The page map represents the composite image that is developed from all of the regions to be displayed, accounting for patterned areas, opaque areas, and transparent areas.

Computation of pixel intensity values in the page map is conventionally accomplished by a multi-pass firmware algorithm executed by a microprocessor circuit. The performance of such circuits is limited by microprocessor speed, instruction set, amount of memory available, and memory management. The instruction set and the width of data items are chosen and ordinarily fixed so that performance can be optimized for complex operations. These design choices make the microprocessor a performance bottle neck for pixel computations because each pixel is given the full data item width.

In view of the problems described above and related problems that consequently become apparent to those skilled in the applicable arts, the need remains in all-points-addressable displays and printers for systems that quickly compute pixel intensity values.

SUMMARY OF THE INVENTION

Accordingly, a printer in one embodiment of the present invention includes a register, an arithmetic unit, and a print engine. The register stores a first operand and a second operand. Each operand includes an N-tuple of intensity values. An N-tuple in one embodiment is a set of values stored in the register in parallel format at one address. The arithmetic unit, in one embodiment, computes a result in response to the first and second operands. The result includes an N-tuple of intensity values. The print engine prints a pixel having an intensity value responsive to an intensity value of the result.

According to a first aspect of such an embodiment, multiple intensity values are computed in parallel through the arithmetic unit. For example, when each operand includes four 8-bit intensity values, four new intensity values are computed in one cycle of a 32-bit arithmetic unit of the present invention. A conventional page map is updated according to the present invention in a fraction of the time ordinarily consumed by a firmware based pixel processing architecture.

According to another aspect, the number of pixels per N-tuple is varied as needed to efficiently prepare a page map for printing. Intensity values in a color graphic portion of the page map are computed using 8-bit intensity values and in a text portion of the page map are computed using 1-bit or 2-bit intensity values.

A display system, in an alternate embodiment of the present invention described above, includes a display in place of the print engine. The display portrays a pixel having an intensity value responsive to an intensity value of the result. The benefit of parallel processing described above for the printer embodiment applies equally well to this display system embodiment.

A printer, in another embodiment of the present invention, includes a pixel processor, a memory, a central processor, and a print engine. The pixel processor includes the register and arithmetic unit as described above. The memory includes a page map. The central processor identifies an N-tuple of intensity values for the first operand and another N-tuple of intensity values for the second operand. When the pixel processor has computed a result N-tuple of intensity values, the central processor stores the result in the page map. The print engine is coupled to the memory for printing a pixel with an intensity responsive to the page map.

According to a first aspect of such an embodiment, the central processor cooperates with the pixel processor to update the page map faster than a conventional microprocessor with conventional firmware.

According to another aspect, the pixel processor and central processor cooperate in parallel, increasing throughput of the central processor.

The central processor and the pixel processor in further embodiments cooperate for still greater throughput. In such embodiments, the central processor identifies a pattern operand, a color operand, a source mask, an old-destination operand, and a pattern mask. The pixel processor further includes a first circuit that computes a brush operand from the pattern and color operands and a second circuit that computes a transparency operand from the old-destination, the arithmetic unit result, the source mask, and the pattern mask.

In yet another embodiment, a pixel processor is packaged as an integrated circuit for realizing, at the system level, the conventional benefits of high density electronic packaging.

These and other embodiments, aspects, advantages, and features of the present invention are set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

In each functional block diagram, a line with a slash and an integer width symbolically represents a group of signals that together signify a binary code. For example, a group of address lines is represented by a line with a slash because a binary address is signified by the signals taken together at an instant in time. A group of signals having no binary coded relationship is shown as a single line with an arrow. A single line between functional blocks represents one or more signals.

Signals that appear on several figures and have the same mnemonic are directly or indirectly coupled together. A signal named with a mnemonic and a second signal named with the same mnemonic followed by an asterisk are related by logic inversion.

In each timing diagram the vertical axis represents binary logic levels and the horizontal axis represents time. The vertical axis is intended to show the transition from active (asserted) to passive (non-asserted) levels of each logic signal. The voltages corresponding to the logic levels of the various signals are not necessarily identical among the various signals.

A person having ordinary skill in the art will recognize where portions of a diagram have been expanded to improve the clarity of the presentation.

DETAILED DESCRIPTION OF THE PREFERRED EMBODIMENT

Figure 1:
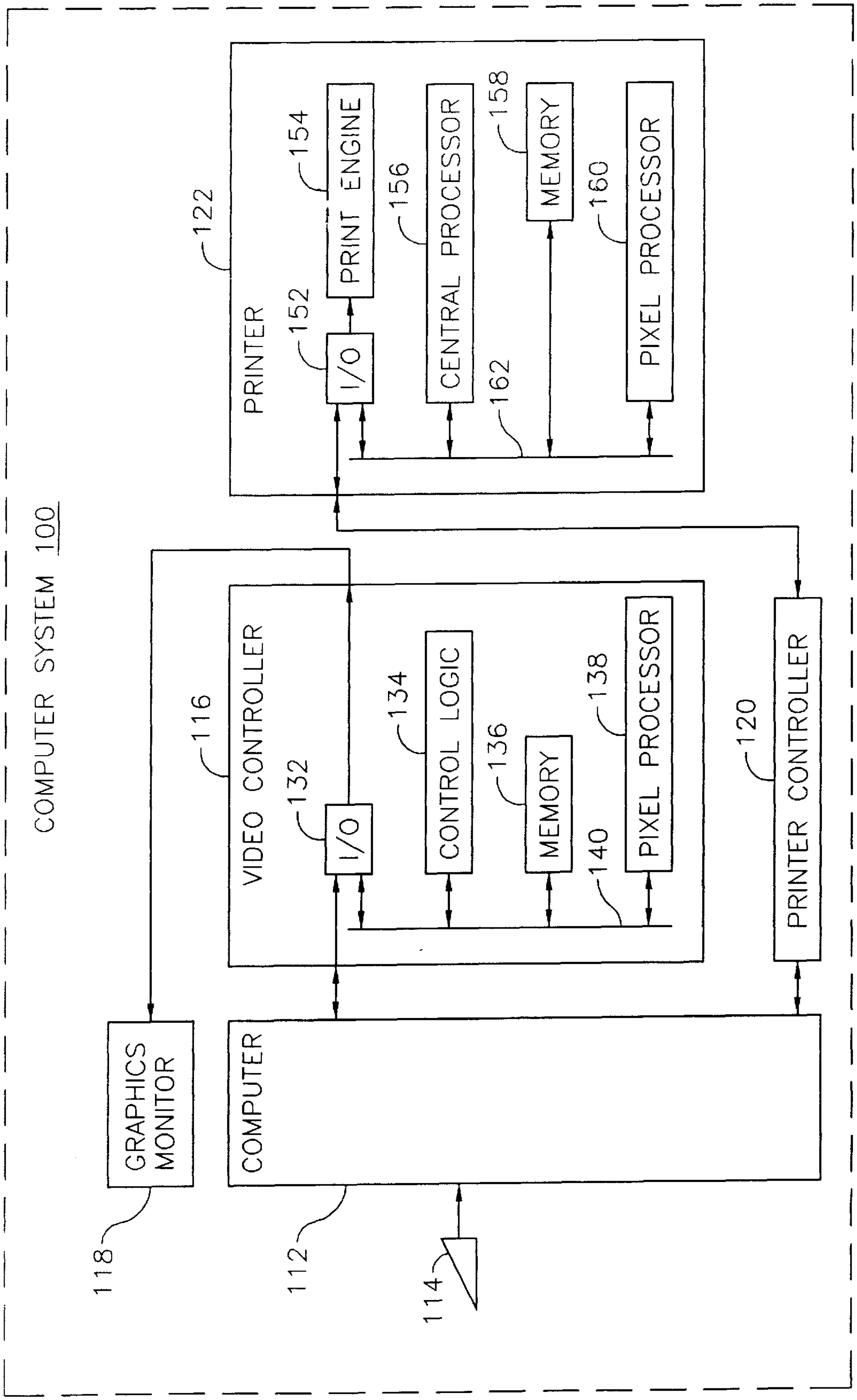
FIG. 1 is a block diagram of a computer system according to an embodiment of the present invention.

FIG. 1 is a block diagram of a computer system according to an embodiment of the present invention. Computer system 100 includes computer 112 that responds to input from keyboard 114 so as to define images to be displayed by graphics monitor 118 and printed on printer 122. Operation of graphics monitor 118 to display an image is made possible by the cooperation of computer 112 and video controller 116. Likewise, operation of printer 122 is made possible by the cooperation of computer 112 and printer controller 120. Computer 112, keyboard 114, graphics monitor 118, and printer controller 120 employ conventional structures for conventional functional cooperation.

Video controller 116 includes input/output circuit 132, control logic 134, memory 136, pixel processor 138, and bus 140. The structure and functions of input/output 132, memory 136, and bus 140 are conventional. Control logic 134 performs, among other functions, conventional display image formatting and rasterization. Pixel processor 138 cooperates with control logic 134 to define and update a page map of the conventional type in memory 136. Data describing portions of a display image to be included in the page map are transferred from computer 112 to memory 136, via input/output circuit 132, under the direction of control logic 134. These descriptions are generally of the type described in U.S. Pat. Nos. 5,463,728 to Blahut et al., 5,147,547 to Beck et al., 5,157,765 to Birk et al., and 4,918,624 to Moore, et al.

Memory 136 includes firmware that directs control logic 134 through the complex tasks of correctly interpreting descriptions received from computer 112, formatting the display image, converting the display image to raster data, and managing the use of memory 136. The steps of interpreting, formatting, and converting are of the type described in the above referenced U.S. Patents and U.S. Pat. No. 5,533,185 to Lentz et al. Portions of this firmware as well as specific status and control signals on bus 140 cooperate to facilitate operation of pixel processor 138. Conventional design techniques are sufficient for the selection of appropriate firmware portions, status signals, and control signals in light of the detailed description of pixel processor 301 that follows particularly with reference to FIGS. 3 and 5.

Printer 122 includes input/output logic 152, print engine 154, central processor 156, memory 158, pixel processor 160, and bus 162. The structure and functions of input/output 152, print engine 154, memory 158, and bus 162 are conventional. Central processor 156 performs, among other functions, conventional print image formatting and rasterization. Pixel processor 160, which is identical in structure and function to pixel processor 138, cooperates with central processor 156 to define and update a page map of the conventional type in memory 158. Data describing portions of a print image to be included in the page map are transferred from computer 112 to memory 158, via controller 120 and input/output circuit 152, under the direction of central processor 156. These descriptions conform to a print control language generally of the type known as PCL printer language marketed by Hewlett-Packard Co. or Postscript printer language marketed by Adobe Systems, Inc.

Memory 158 includes firmware that directs central processor 156 through the complex tasks of correctly interpreting descriptions received from computer 112, formatting the print image, converting the print image to raster data, and managing the use of memory 158. Portions of this firmware as well as specific status and control signals on bus 162 cooperate to facilitate operation of pixel processor 160. Conventional design techniques are sufficient for the selection of appropriate firmware portions, status signals, and control signals in light of the detailed description of pixel processor 301 that follows particularly with reference to FIGS. 3 and 5.

Control logic 134 and central processor 156 are alternate examples of a control circuit designed and implemented using conventional state machine and processor technologies.

As an introduction to the terminology to be used in describing a pixel processor of the present invention, a sophisticated display or print image is described below. Images similar to the image described are common in personal computer systems operating a Windows operating system as marketed by Microsoft.

Figure 2:
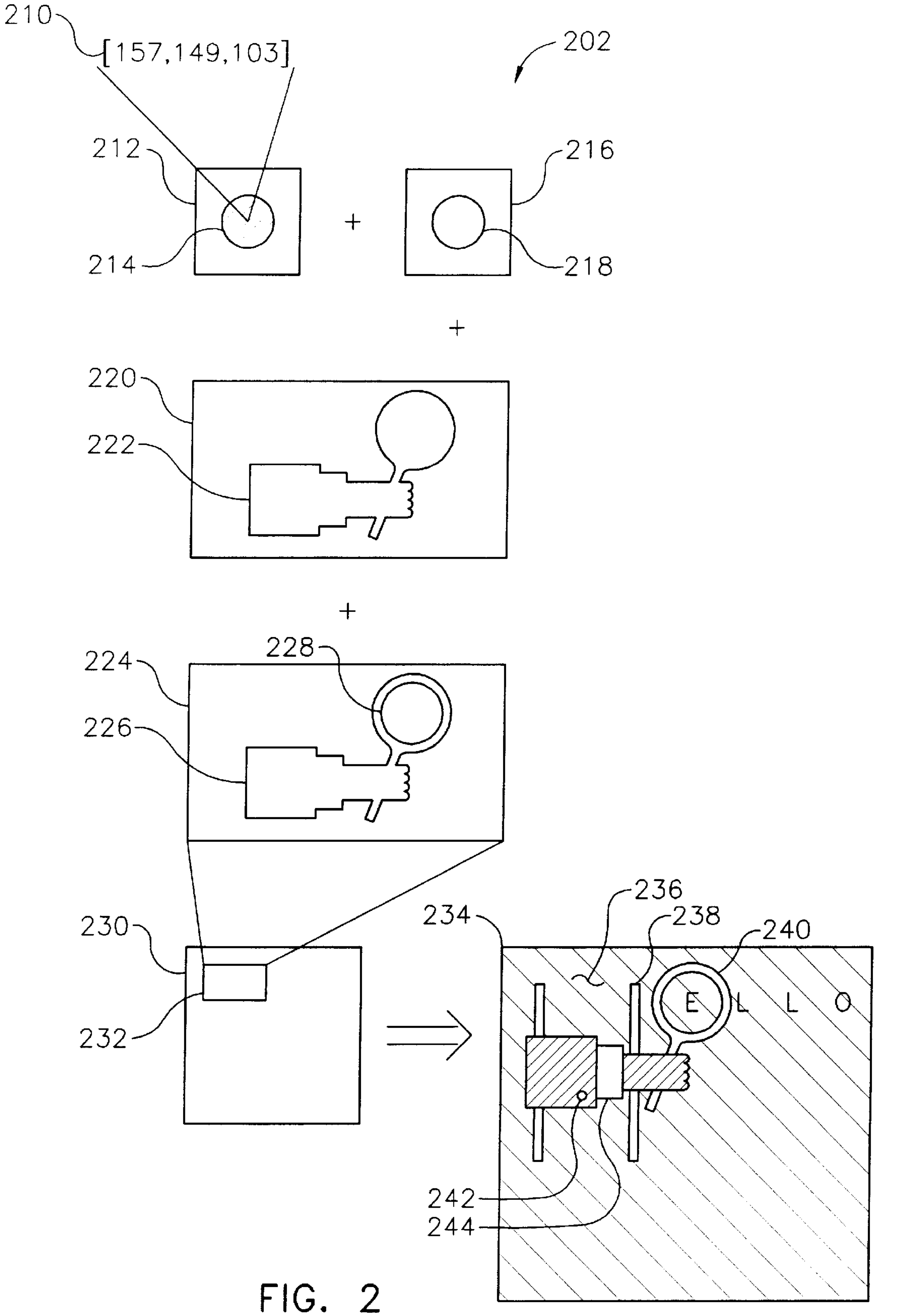
FIG. 2 is an illustration of the components of an image stored and updated according to an embodiment of the present invention.

FIG. 2 is an illustration of the components of a display or print image stored and updated according to an embodiment of the present invention. In this illustration, a cursor image is to be located over an existing image. The existing image includes the text of the word "Hello," portrayed on a colored background, shown cross hatched. The cursor image for this example, a gloved hand holding a magnifying glass, illustrates opaque colored portions, opaque white portions, and a transparent portion.

In data flow 202, the desired update of page map 234 is accomplished generally by the combination of brush 212, pattern mask 216, source region 220, source mask region 224, and clip region 232. At the lowest level, the color to be used for the suit coat and glove are specified by a color set 210 that includes an integer intensity value for each of the primary colors red, green, and blue. As shown, each intensity value is a binary number in the range 0–255. For simplicity, consider page map 234 to correspond to only one of the three color planes.

The color in this example is to be applied not as a solid but as a polka dot pattern. Brush 212 defines one pattern unit or "tile" including a portion 214 which is to receive color set 210 and the remainder which is to remain white.

Brush 212 is represented in FIG. 2 as an array of intensity values that each result from an arithmetic operation on respective elements of a pattern array, not shown, and an intensity value of color set 210. The color depth of elements of the pattern array and the color depth of a color from color set 210 are equal, i.e. each employs 8 bits per pixel. Therefore, on a pixel-by-pixel basis, an element of the pattern array is at the maximum color intensity value, for example 11111111 for an 8-bit embodiment, to specify that color is to be applied, and at a minimum value, for example 00000000, elsewhere. The arithmetic operation performed on a color intensity value and a pattern array element value is the arithmetic AND as described below in Table 2 as the minimum of the two values. As will become apparent with reference to FIG. 3, brush 212, in one embodiment, is not represented as an array in memory, but is computed as needed, i.e. "on the fly."

Pattern mask 216 is represented in FIG. 2 as an array having one bit per pixel. This bit describes whether the pixel is to be transparent or opaque. Pattern mask 216 represents one pattern unit. Since the portion 218 to be colored and the remainder to remain white are both to be opaque, all elements of the pattern mask array have the same value.

Source region 220 defines portion 222 to be patterned. The pattern tile shown as brush 212 is shown greatly enlarged with reference to source region 220. In this example, the polka dotted pattern as a whole is to be tiny as in a halftone. To achieve this result, brush 212 is used repeatedly to "tile" within portion 222. For the red color plane, all pixels within portion 222 that are members of a polka dot are set to the intensity value 157 of color set 210. Those pixels that are not members of a polka dot are set to the intensity for opaque white, for example 0 or 255.

Source region 220, is represented in memory as an array of intensity values. Source region 220 and brush 212 are combined by an arithmetic operation on respective elements of the source array and brush array. The color depth of elements of the source array and brush array are equal, i.e. each employs 8 bits per pixel. Therefore, on a pixel-by-pixel basis, an element of the source array is at the maximum color intensity value, for example 11111111 for an 8-bit embodiment, to specify that brush is to be applied, and at a minimum value, for example 00000000, elsewhere. The arithmetic operation performed on a brush array element value and a source array element value is the arithmetic AND as described below in Table 2 as the minimum of the two values.

Source mask region 224 includes portion 226 and portion 228. Source mask region 224, in one embodiment, is represented in memory as an array having one bit per pixel. Pixels within portion 228 are to be transparent, as opposed to pixels within portion 226, which are to be opaque.

The combination of color, pattern, and source is limited to a portion of page map 230 defined by clip region 232. In one embodiment, clip region 232 is represented in memory as an array having one bit per pixel. This bit describes whether or not to allow an update to the corresponding intensity value of page map 230.

A portion of page map 230 is shown in expanded form as page map 234. Some pixels within this portion of the page map have been updated in three passes. In the first pass, a colored background 236 was defined, as depicted with cross hatch, and the opaque text 238 of the word "Hello" was set out. In the second pass, the result of combining color set 210 with pattern array, not shown, to form brush 212, tiled within source region 220, and clipped so as to update clip region 232 provided a cursor image that is opaque as to background 236 and text 238, except where transparent within magnifying glass 240. In the third pass, the color and opaque quality of button 242, shirt cuff 244, and the body of magnifying glass 240 was applied by a similar combination result to complete the image for display or printing.

Translucent portions were not described above with reference to FIG. 2, to simplify the presentation. If, however, the cursor image were to include a shadow cast by the hand and magnifying glass, for example as a result of an imaginary light source above and to the left of the cursor image, the shadow could be represented as a translucent portion of the cursor image. To implement the shadow, some of background color 236 and some of the letter "H" in text 238 is modified with an additional pass through page map 230. In one embodiment, this fourth pass includes the result of combining a color set including black, a pattern having a pin point dot to receive the color set, a pattern mask defining the remainder of the pattern tile as transparent, and a source region defining only the region to be shadowed.

As is now apparent, the preparation of a common image for display or print involves several complex computations on each of possibly millions of pixels. Several passes are performed on each pixel to portray an image of overlapping objects and for specifying the intensity values in separate color planes. The pixel processor of the present invention provides the high speed, low cost apparatus for these computations and is useful for both display and print systems.

Figure 3:
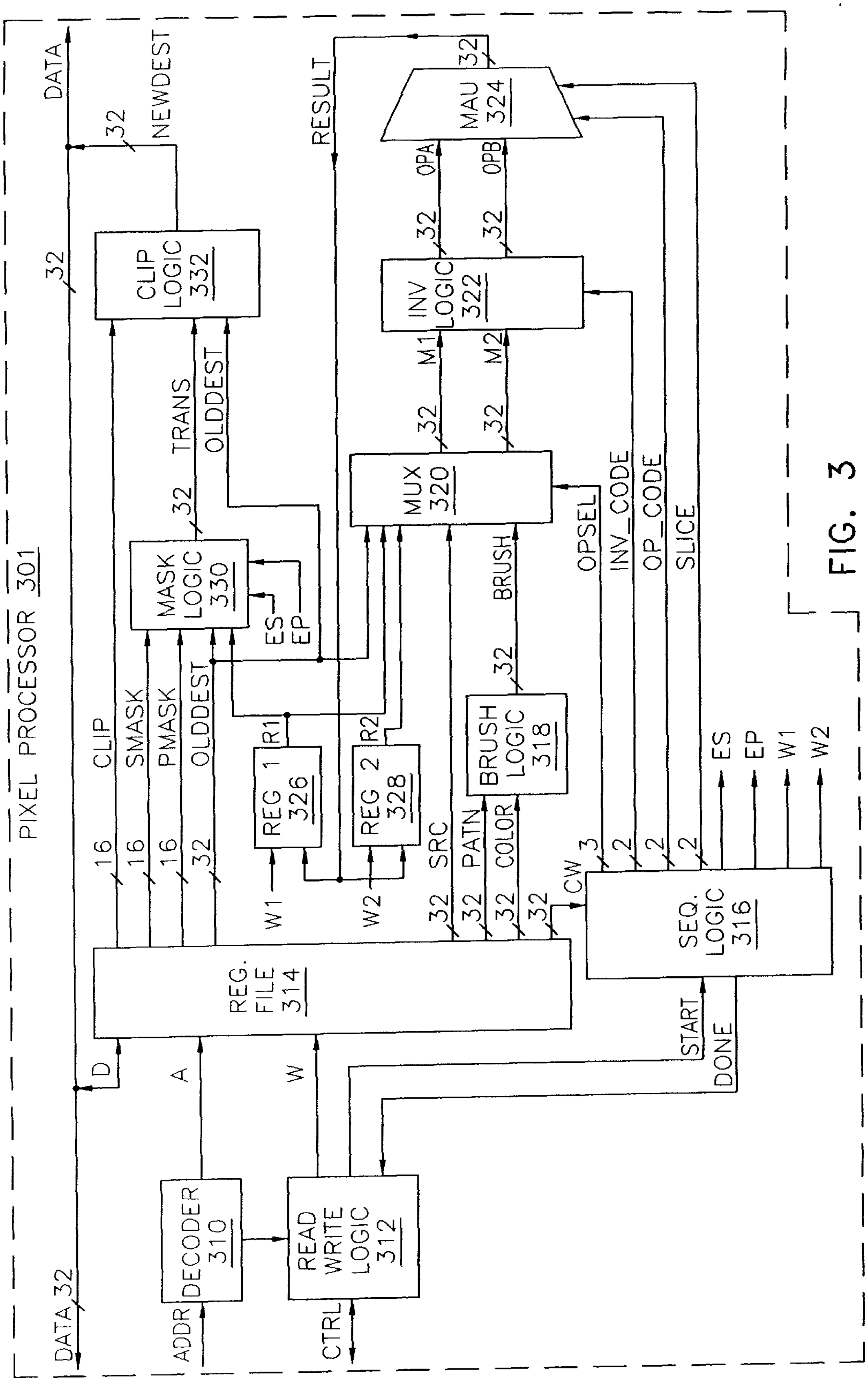
FIG. 3 is a functional block diagram of the pixel processor shown in FIG. 1.

FIG. 3 is a functional block diagram of pixel processor 301 used in pixel processors 138 and 160 shown in FIG. 1. Conventional digital logic design and fabrication techniques are employed throughout pixel processor 301. Pixel processor 301 responds to a command word to operate on up to 16 pixels in parallel during command execution. In the discussion which follows, pixel processor 301 is described with reference to its use in pixel processor 160, coupled to bus 162, as shown in FIG. 1.

Bus 162 conveys a DATA signal for transferring commands and intensity values, an ADDR signal for identifying an address, and a CTRL signal used for synchronizing bus activity. Decoder 310 decodes the ADDR signal to identify, via signal A, a particular register in register file 314 to be read as, or to be written by, the DATA signal. Read write logic 312 responds to the CTRL signal to invoke read and write operations on register file 314 via signal W. Signals ADDR and CTRL together identify a START signal that activates sequence logic 316. When sequence logic 316 has completed execution of a pixel processor command, sequence logic 316 provides a DONE signal to read write logic 312. The DONE status of pixel processor 301 is conveyed by read write logic 312 as an interrupt or, in an alternate embodiment, as a response to a poll.

Register file 314 includes several registers and provides corresponding signals conveying present register contents. Register file contents and signals are described in Table 1. Because pixel processor 301 employs a reconfigurable bit-slice architecture, to be described below, the number of intensity values processed in parallel is subject to dynamic reconfiguration. When multiple intensity values are stored at one address or conveyed in parallel format, the set of intensity values is called an "N-tuple" of intensity values.

The illustrated embodiment specifies the DATA signal on 32 lines, i.e. a conventional 32-bit parallel data bus. This bus is sufficient to convey in parallel four 8-bit intensity values. For such an embodiment N equals 4; and an N-tuple consists of 4 values. In an alternate configuration, the same 32-bit data bus conveys in parallel sixteen 2-bit intensity values. For this alternate configuration, N equals 16; and an N-tuple consists of 16 values.

TABLE 1

| Address | Contents | Signal |
|---|---|---|
| 000 | Command word defining the dynamic configuration and four cycles of computation | CW |
| 001 | Pattern word defining N pattern array elements (minimum or maximum intensity values) | PATN |
| 010 | Color word defining N intensity values | COLOR |
| 011 | Source word defining N source array elements (minimum or maximum intensity values) | SRC |
| 100 | Prior destination word defining N page map array elements from a prior pass (intensity values) | OLDDEST |
| 101 | Pattern mask word defining N bits, unused bits are zero | PMASK |
| 110 | Source mask word defining N bits, unused bits are zero | SMASK |
| 111 | Clip region word defining N bits, unused bits are zero | CLIP |

Register file 314, register 326, and register 326 comprise a register that cooperates with an arithmetic unit. The arithmetic unit shown in FIG. 3 includes brush logic 318, multiplexer 320, inversion logic 322, multi-pixel arithmetic unit 324, mask logic 330, and clip logic 332.

Signal BRUSH is provided by brush logic 318 in response to signal PATN and COLOR from register file 314. Signals PATN and COLOR each convey an N-tuple of intensity values. Signal BRUSH is an N-tuple result of the independent combination of respective intensity values from PATN and COLOR. The combination operation is an arithmetic AND, defined below in Table 2. By computing BRUSH on the fly, separate storage in memory 136 or 158 becomes unnecessary. Consequently, memory management is simplified.

Multi-pixel arithmetic unit (MAU) 324 performs one selected operation during each so-called cycle. Two N-tuple operands are input to each operation. However, the same operation is performed with independent results on each of N respective pairs of so-called channel-operands. As such, there are N independent parallel processing channels through MAU 324. The selected operation is identified by signal OP_CODE provided by sequence logic 316. The set of possible operations, in one embodiment, is described in Table 2.

TABLE 2

| OP_CODE | Name | Symbol | Example | Definition |
|---|---|---|---|---|
| 00 | AND | & | x & y | min(x, y) |
| 01 | OR | \| | x \| y | max(x, y) |
| 10 | XOR | ^ | x ^ y | \|(x−y)\| |

The operations defined in Table 2 are arithmetic rather than logical. The result of the AND operation is the minimum of the two input operands as determined by an arithmetic comparison. The result of the OR operation is the maximum of the two input operands as determined by an arithmetic comparison. The exclusive-or operation is the absolute value of the arithmetic difference of the operands.

Formal operands for processing by MAU 324 are conveyed by signals OPA and OPB. These signals are the result of operand selection by multiplexer 320 and selective inversion by inversion logic 322.

Multiplexer 320 provides two N-tuple operands via signals M1 and M2. Each N-tuple operand consists of N channel-operands. Channel-operands are selected from the set of N-tuple signals including OLDDEST, SRC, BRUSH, and the intermediate N-tuple results stored in register 326 and register 328. Registers 326 and 328 provide N-tuple signals R1 and R2, respectively. Multiplexer 320 responds to signal OPSEL to provide a selected two N-tuple operands as described in Table 3.

TABLE 3

| OPSEL | M1 | M2 |
|---|---|---|
| 000 | no operation | no operation |
| 001 | SRC | BRUSH |
| 010 | SRC | OLDDEST |
| 011 | BRUSH | OLDDEST |
| 100 | SRC | R1 |
| 101 | BRUSH | R1 |
| 110 | OLDDEST | R1 |
| 111 | R2 | R1 |

For a 32-bit processor as illustrated, the least significant channel-operands correspond to signals M1[0:7] and M2[0:7]. These signals are selected from the set of OLDDEST[0:7], SRC[0:7], BRUSH[0:7], R1[0:7], and R2[0:7]. Channel-operand selection is directed by the signal OPSEL provided by sequence logic 316. For each cycle, one selection is made. The selection made, for example SRC and BRUSH, applies identically to all processing channels for that cycle.

Inversion logic 322 selectively inverts signals M1 and M2 to provide formal operand signals OPA and OPB. When inversion is specified for a particular N-tuple signal, such as M1, all channel-operands of that signal are independently subject to bit-for-bit inversion to form the 1's complement of each channel-operand. Otherwise, all channel-operands are passed without inversion. Selective inversion is specified by signal INV_CODE provided by sequence logic 316 as described in Table 4.

TABLE 4

| INV_CODE | OPA | OPB |
|---|---|---|
| 00 | M1 | M2 |
| 01 | ~M1 | M2 |
| 10 | M1 | ~M2 |
| 11 | ~M1 | ~M2 |

Sequence logic 316 receives a command word via signal CW from register file 314. Each command word directs the execution of four sequential operations by MAU 324, regardless of the number of pixels in each N-tuple. The format of the command word, for the 32-bit embodiment shown, is described in Table 5.

TABLE 5

| Command Word Bits | Cycle | Signal |
|---|---|---|
| 31:30 | All | SLICE |
| 29:27 | 1 | OPSEL |
| 26:25 | 1 | INV_CODE |
| 24:23 | 1 | OPCODE |
| 22:20 | 2 | OPSEL |

TABLE 5-continued

| Command Word Bits | Cycle | Signal |
|---|---|---|
| 19:18 | 2 | INV_CODE |
| 17:16 | 2 | OP_CODE |
| 15:13 | 3 | OPSEL |
| 12:11 | 3 | INV_CODE |
| 10:9 | 3 | OP_CODE |
| 8:6 | 4 | OPSEL |
| 5:4 | 4 | INV_CODE |
| 3:2 | 4 | OP_CODE |
| 1:0 | 4 | P_MODEL |

Sequence logic 316 directs storage of MAU 324 output signal RESULT in registers 326 and 328 by generating respective write signals W1 and W2. During cycle 1, sequence logic 316 always generates signal W1 for storage of signal RESULT in register 326. During cycles 2, 3, and 4, neither signal W1 nor W2 is generated if signal OPSEL is 000, indicating a "no operation" cycle. Otherwise, signals W1 and W2 are generated as described in Table 6.

TABLE 6

| OPSEL | W1 | W2 |
|---|---|---|
| 000 | inactive | active for write |
| 001 | inactive | active for write |
| 010 | inactive | active for write |
| 011 | inactive | active for write |
| 100 | active for write | inactive |
| 101 | active for write | inactive |
| 110 | active for write | inactive |
| 111 | active for write | inactive |

By defining four sequential cycles with storage of results as intermediate operands, the structure of pixel processor 301 supports a command set that includes several sophisticated pixel processing commands. The command set in one embodiment is described in Table 7.

TABLE 7

| Cmd. | RESULT |
|---|---|
| 1 | OLDDEST \| (BRUSH \| SRC) |
| 2 | (~(BRUSH \| SRC)) & OLDDEST |
| 3 | BRUSH \| SRC |
| 4 | (~(OLDDEST ˆ SRC)) \| BRUSH |
| 5 | (~BRUSH) & OLDDEST |
| 6 | (((~(BRUSH & SRC)) & OLDDEST) ˆ SRC) ˆ BRUSH |
| 7 | ((SRC ˆ BRUSH) & (OLDDEST ˆ SRC) ˆ SRC |
| 8 | (SRC ˆ BRUSH) & (BRUSH ˆ OLDDEST) |
| 9 | SRC ˆ (OLDDEST & (~(BRUSH & SRC))) |
| 10 | (OLDDEST ˆ SRC) & (SRC ˆ BRUSH) |
| 11 | BRUSH ˆ (OLDDEST & (~(SRC & BRUSH))) |
| 12 | BRUSH ˆ (SRC ˆ (OLDDEST \| (BRUSH & SRC))) |
| 13 | SRC ˆ ((SRC ˆ BRUSH) & (BRUSH ˆ OLDDEST)) |

Sequence logic 316 cooperates with mask logic 330 to perform masking operations during the fourth cycle. The result of masking operations is an N-tuple of intensity values conveyed by signal TRANS. For each intensity value of signal TRANS, one bit from source mask signal SMASK and one bit from pattern mask signal PMASK together determine whether the corresponding intensity value from signal OLDDEST or from signal R1 is used.

Signals ES and EP, provided by sequence logic 316, enable source masking and pattern masking, respectively. When masking is not enabled, signal TRANS reflects register output signal R1. Otherwise, signal TRANS reflects either signal R1 or signal OLDDEST, according to a print model.

The masking operation outcomes for signal TRANS that are described in Table 8 apply for a print model wherein portions of the source region not to be patterned are transparent and portions of the brush not to receive color are also transparent. Conventional logic design techniques are sufficient to implement other print models in alternate embodiments.

TABLE 8

| SMASK | PMASK | TRANS |
|---|---|---|
| 1 | 1 | R1 |
| 1 | 0 | OLDDEST |
| 0 | 1 | OLDDEST |
| 0 | 0 | OLDDEST |

One of four print models is specified in each command word by a 2-bit code P_MODEL, described in Table 5. Sequence logic 316 responds to code P_MODEL to provide source masking enable signal ES and pattern masking enable signal EP. In the embodiment discussed above, P_MODEL is 00 and both pattern masking and source masking are enabled. An alternate print model is invoked, for example when code P_MODEL is 01. In such an alternate print model signals ES and EP disable both source and pattern masking. Such a print model is used, for example, when portions of the source region not to be patterned are opaque and portions of the brush not to receive color are also opaque. The alternate print model is used, for example, with the Postscript printer language.

Clip logic 332 provides signal NEWDEST as a consequence of combining signal TRANS with signal OLDDEST, according to signal CLIP. Signals OLDDEST and CLIP are provided by register file 314. The combination follows the general relation below, wherein signal OLDDEST and signal NEWDEST each convey an N-tuple of intensity values and signal CLIP conveys one bit for each respective intensity value.

NEWDEST=if CLIP, then OLDDEST, else TRANS

When control logic 134 or central processor 156, shown in FIG. 1, recognize the DONE signal, the intensity values conveyed by signal NEWDEST are transferred to the page map stored in memory 136 or 158, respectively.

Pixel processor 301, in alternate embodiments, is implemented as an application specific integrated circuit (ASIC) with the addition of conventional power, ground, diagnostic, configuration, and chip input/output circuitry. In one such embodiment, additional chip input/output signals are provided for specifying reset, status reporting method as polled or on interrupt, and overrides for print models, slice boundaries, and the like. Such functions are conventionally provided on integrated circuits to increase the number of different circuit applications supported.

Figure 4:
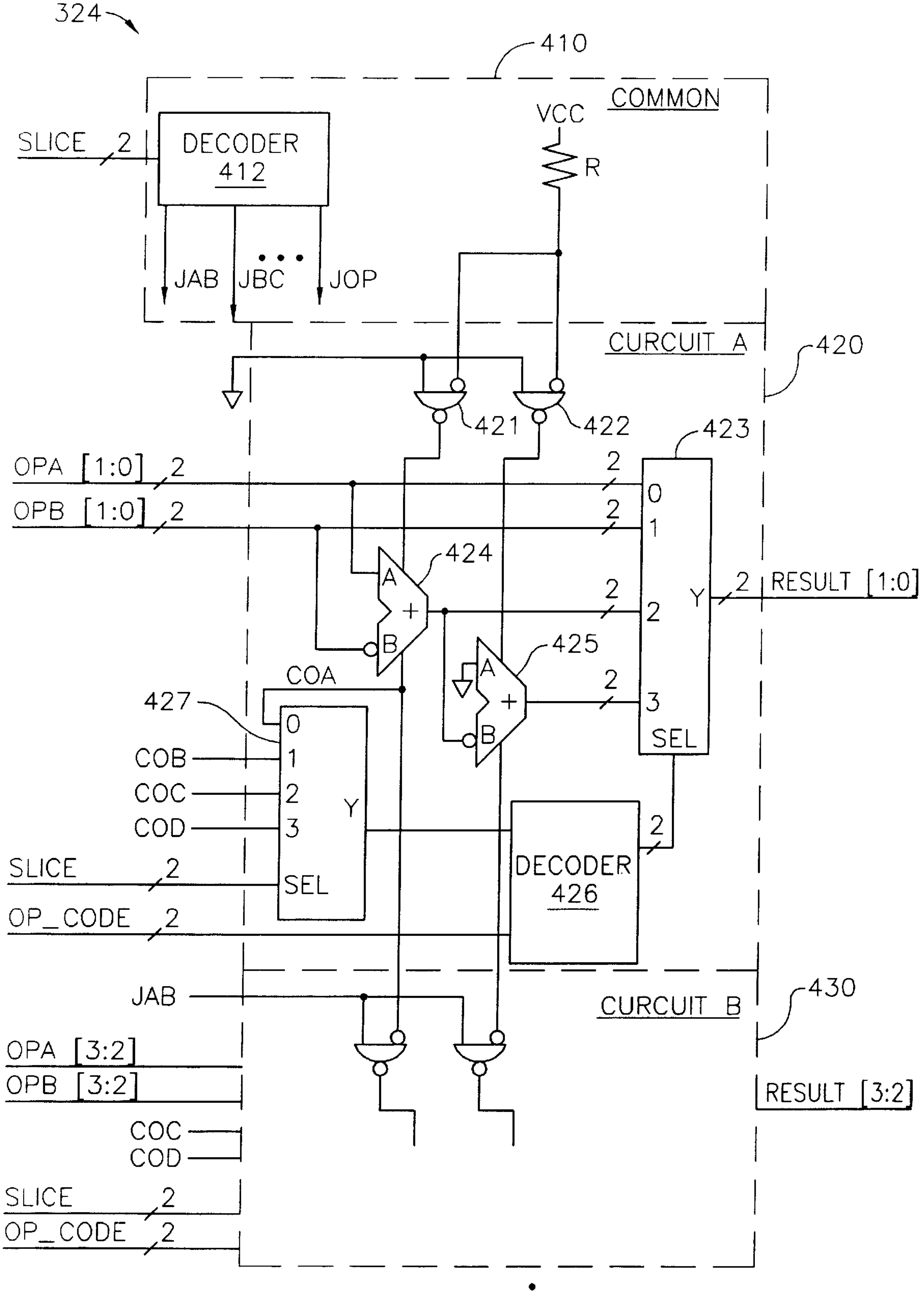
FIG. 4 is a functional block diagram of the multi-pixel arithmetic unit shown in FIG. 3.

FIG. 4 is a functional block diagram of multi-pixel arithmetic unit (MAU) 324 shown in FIG. 3. MAU 324 employs a reconfigurable bit-slice architecture wherein the smallest slice supports 2 bits. In alternate embodiments, a larger number of bits per slice are employed to reduce complexity at the expense of some flexibility.

MAU 324 includes common circuitry 410 and a plurality of slice circuits of which slice circuit A 420 and slice circuit B 430 are shown. Common circuitry 410 includes a pull-up circuit and decoder 412. The pull-up circuit, consisting essentially of resistor R, provides a logic 1 for carry inputs to be discussed below. Decoder 412 responds to the 2-bit signal SLICE, provided by sequence logic 316, to direct up to four configurations. Decoder 412 provides signals JAB, JBC, etc. for joining slice circuits A to B, B to C, etc. The logic of decoder 412 is described in Table 9.

TABLE 9

| SLICE | Configuration | Active Join Signals |
|---|---|---|
| 00 | N = 16; 2 bits per pixel | none |
| 01 | N = 8; 4 bits per pixel | JAB, JCD, JEF, JGH, JIJ, JKL, JMN, JOP |
| 10 | N = 5; 6 bits per pixel | JAB, JBC, JDE, JEF, JGH, JHI, JJK, JKL, JMN, JNO |
| 11 | N = 4; 8 bits per pixel | JAB, JBC, JCD, JEF, JFG, JGH, JIJ, JJK, JKL, JMN, JNO, JOP |

When SLICE is 11, for example, three boundaries are defined to provide four independent processing channels through MAU 324. These boundaries correspond to the unasserted state of signals JDE, JHI, and JLM. These signals in the unasserted state prevent carry signals from crossing from slice circuit D to slice circuit E, from slice circuit H to slice circuit I, and from slice circuit L to slice circuit M. In this example, no boundary has been defined between circuit A 420 and circuit B 430. Therefore, these slice circuits cooperate in two ways. First, because signal JAB is asserted, circuit A 420 provides carry-out signals to circuit B 430. Second, multiplexer 423 responds to the most significant carry-out signal of the channel, COD, as selected by multiplexer 427, discussed below.

Slice circuit A 420 includes gates 421 and 422, adders 424 and 425, decoder 426, and multiplexers 423 and 427. Gate 421 and adder 424 constitute a subtracter that accepts two 2-bit channel-operands and provides a 2-bit result to multiplexer 423 input 2. Subtraction results from adding to the signal appearing on adder 424 input A, the 2's complement of the signal appearing on adder 424 input B. In other words, subtraction results from adding to input A the 1's complement of input B with a 1 at the carry input of adder 424 provided by the pull-up circuit. The carry-out of slice circuit A 420, signal COA, indicates whether the difference computed by the subtracter is less than zero.

When the interface between slice circuits 420 and 430 is configured as a boundary, decoder 426 responds to signal COA to select the appropriate channel-operand as the result for operations AND and OR, described in Table 2.

The absolute value of the difference, required for the XOR operation in Table 2, is identified by multiplexer 423 which selects either the output of the subtracter circuit formed by gate 421 and adder 424, or the output of a second subtracter circuit formed by gate 422 and adder 425. Multiplexer 423 makes this selection in response to the carry-out signal selected by multiplexer 427.

Multiplexer 427 responds to signal SLICE to provide an appropriate carry-out signal from the most significant slice circuit in the configured processing channel. For the least significant channel in a 2-bit, 4-bit, 6-bit, or 8-bit channel configuration, the appropriate carry-out signal is signal COA, COB, COC, or COD, respectively. Signals COB, COC, and COD are the respective carry-out signals of slice circuit B 430, slice circuit C (not shown), and slice circuit D (not shown), respectively. The corresponding multiplexers and decoder in each slice circuit of a channel cooperate in the same way with respect to signal SLICE as described above with reference to slice circuit A 420.

In an alternate embodiment having less propagation delay, adder 425 accepts the same inputs as adder 424, but in reverse order. In other words, input A of adder 425 accepts OPB[1:0] and input B accepts OPA[1:0]. The illustrated embodiment is preferred for implementing pixel processor 301 as an integrated circuit wherein adder 425 is implemented with less complexity than adder 424 due to the fact that one of its input is a constant, logic 0.

Figure 5:
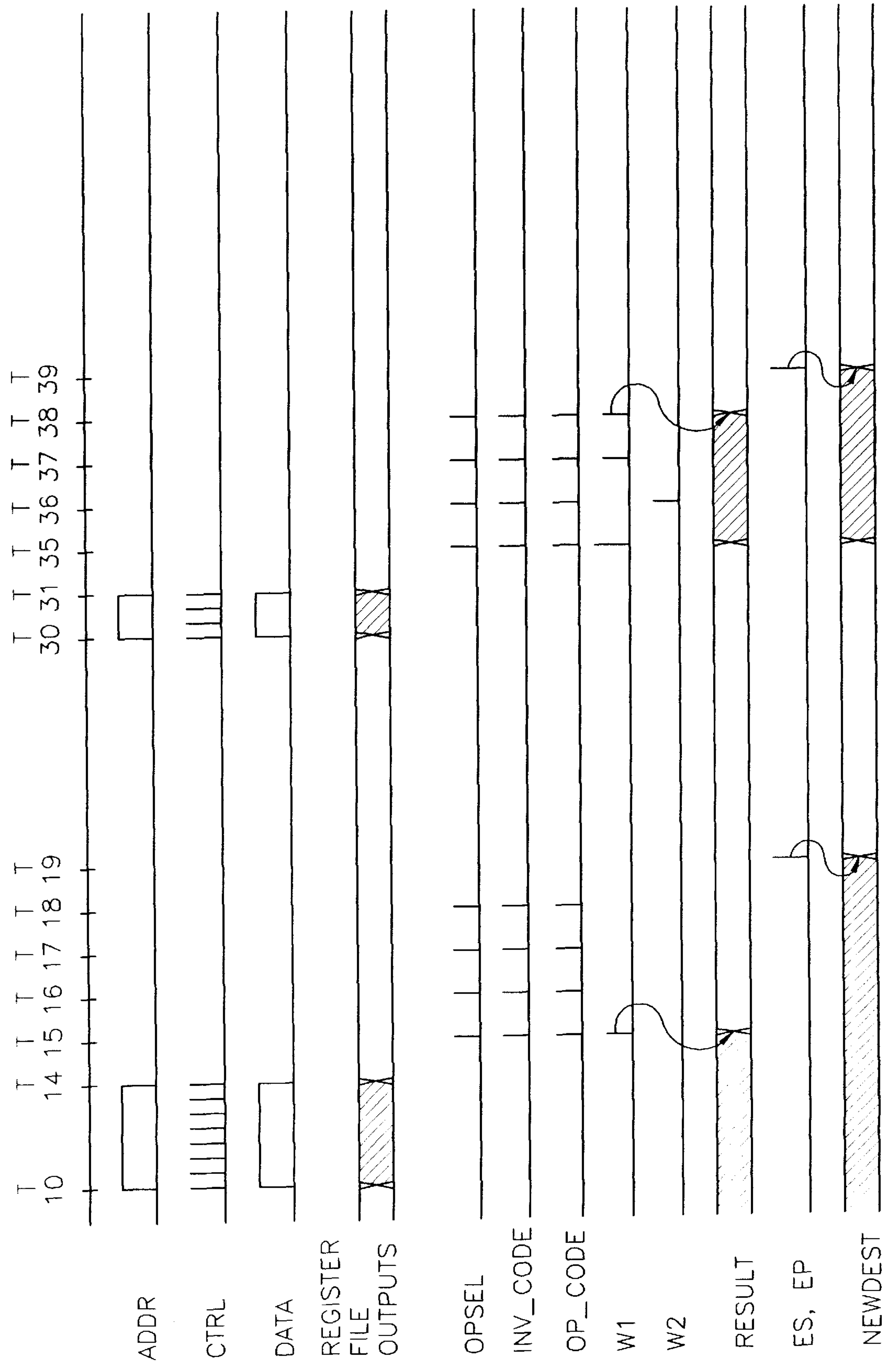
FIG. 5 is a simplified timing diagram of the operation of the pixel processor shown in FIG. 3.

FIG. 5 is a simplified timing diagram of the operation of pixel processor 301 shown in FIG. 3. Two four-cycle command executions are illustrated for discussion. From times T10 to T19, pixel processor command 3 from Table 7 is executed. From times T30 to T39, pixel processor command 13 from Table 7 is executed.

From times T10 to T14, signals ADDR, CTRL, and DATA provide initial conditions for command execution. These initial conditions include identifying N-tuple operands and a command word in register file 314. Register file outputs are stable from time T14 to time T30. Command word signal CW, corresponding to command 3 from Table 7, has the 32-bit value [31:0] "00 0110001 0000000 0000000 0000000 00" described in Table 5. The four-cycle execution sequence that accomplishes this command is described in Table 10

TABLE 10

| Time | OPSEL | INV_ CODE | OP_ CODE | Description |
|---|---|---|---|---|
| T15 | 011 | 00 | 01 | R1 = BRUSH \| SRC |
| T16 | 000 | 00 | 00 | no operation |
| T17 | 000 | 00 | 00 | no operation |
| T18 | 000 | 00 | 00 | no operation |

At time T19, masking and clipping functions result in defining signal NEWDEST with the appropriate resulting N-tuple of intensity values. The illustrated embodiment is preferred for simplicity.

An alternate embodiment has improved throughput, when executing pixel processor command 3 and similar commands not requiring all four cycles. In such an embodiment, signals EP and ES are defined after the first cycle and signal DONE is raised at time T15 to eliminate the delay of no-operation cycles.

With reference again to the illustrated embodiment, from times T30 through T31, operands are updated in register file 314 in response to signals ADDR, CTRL, and DATA. Some register contents remain unchanged for efficiency, though at a minimum, the command word is updated. Command word signal CW, corresponding to command 13 from Table 7, has the 32-bit value [31:0] "00 0110010 0010010 1110000 1000010 00" described in Table 5. The four-cycle execution sequence that accomplishes pixel processor command 13 is described in Table 11.

TABLE 11

| Time | OPSEL | INV_ CODE | OP_ CODE | Description |
|---|---|---|---|---|
| T35 | 011 | 00 | 10 | R1 = BRUSH ^ OLDDEST |
| T36 | 001 | 00 | 10 | R2 = SRC ^ BRUSH |
| T37 | 111 | 00 | 00 | R1 = R2 & R1 |
| T38 | 100 | 00 | 10 | R1 = SRC ^ R1 |

All U.S. Patents cited above are hereby incorporated by reference.

The foregoing description discusses preferred embodiments of the present invention, which may be changed or modified without departing from the scope of the present invention. For example, those skilled in the art will understand that conventional data compression techniques are employed in page maps in memories 136 and 158 in alternate embodiments of computer system 100 where speed is compromised for the benefit of lower initial system cost.

Simplifications are made in alternate embodiments. For instance, where BRUSH is stored in register file 314, COLOR and PATN are omitted from register file 314, or not used, and brush logic 318 is omitted or not used. In a second embodiment, PATN conveys the intensity value of one color plane for a pixel within the pattern region and a default value otherwise; COLOR is thereby omitted or not used.

In further alternate embodiments, MAU 324 selectively performs unary as well as binary operations by increasing the number of coded OP_CODE signal values and increasing MAU circuit complexity. An example unary operation is ~SRC. In a related embodiment, an alternate MAU includes some binary operations having negated operand(s) and/or a negated result. An example of such an operation is ~BRUSH & SRC. As a consequence of choosing not to support all combinations of negation of operands, a larger OP_CODE set results, but less circuitry is employed overall.

Further, command word complexity and layout in alternate embodiments comprehends more or fewer than four opcodes per command word, unique values for signals OPSEL, INV_CODE, and OP_CODE for each channel-operand, and multiple command words for each START signal.

In an alternate embodiment, read write logic 312 of pixel processor 138 or 160 includes conventional circuitry for performing direct memory accesses to memory 136 or 158, respectively. Register file 314 in such an embodiment stores pointers to data in addition or instead of the data such as SRC, PATN, etc., described above. Direct memory access circuitry supports greater throughput to graphics monitor 118 or print engine 154, respectively.

Still further, the logical elements described above may be formed using a wide variety of logical gates employing any polarity of input or output signals and that the logical values described above may be implemented using different voltage polarities. As an example, an AND element may be formed using an AND gate or a NAND gate when all input signals exhibit a positive logic convention or it may be formed using an OR gate or a NOR gate when all input signals exhibit a negative logic convention.

These and other changes and modifications are intended to be included within the scope of the present invention.

While for the sake of clarity and ease of description, several specific embodiments of the invention have been described, the scope of the invention is intended to be measured by the claims as set forth below. The description is not intended to be exhaustive or to limit the invention to the form disclosed. Other embodiments of the invention will be apparent to those skilled in the art by reference to the above description of the invention and referenced drawings or by practice of the invention.

The words and phrases used in the claims are intended to be broadly construed. The term "printer" includes devices used for marking media. Such devices include, for example, photographic, electrophotographic, and ink jet engines used in computing and communications systems on media including, for example, film, paper, overhead transparencies, and labels, to name a few representative embodiments.

A "register" includes a plurality of flip-flops, memory cells, latches, combinations thereof and equivalents, organized for sequential, independent, addressable or simultaneous access. An addressable register file in combination with one or more independently accessed banks of flip-flops, as illustrated in FIG. 3, is one embodiment of a register.

A "signal" refers to mechanical and/or electromagnetic energy conveying information. When elements are coupled, a signal can be conveyed in any manner feasible in light of the nature of the coupling. For example, if several electrical conductors couple two elements, then the relevant signal comprises the energy on one, some, or all conductors at a given time or time period. When a physical property of a signal has a quantitative measure and the property is used by design to control or communicate information, then the signal is said to be characterized by having a "value." The value may be instantaneous or an average.

What is claimed is:

1. A printer that prints a pixel having an intensity, the printer comprising:

a. a register, operative to store a first operand and a second operand, each operand comprising an N-tuple of intensity values; and b. an arithmetic unit, coupled to the register, operative to compute, with arithmetic subtraction, a result in a first cycle, the result comprising an N-tuple of intensity values, each respective result intensity value independently responsive to a respective intensity value of the first operand and a respective intensity value of the second operand; and c. a print engine, coupled to the arithmetic unit, operative to print the pixel with the intensity responsive to the result.

2. The printer of claim 1 wherein each N-tuple has an identical number of pixel intensity values.

3. The printer of claim 1 further comprising a memory that stores a page ma comprising a pixel intensity value for each of a plurality of pixels to be printed, the respective pixel intensity value for each of the plurality of pixels being responsive to a respective intensity value of the result.

4. The printer of claim 1 further comprising a memory that stores a page map comprising a plurality of intensity value s for the pixel, the plurality being responsive to the result.

5. The printer of claim 1 wherein:

a. the register is further operative to store a third operand comprising an N-tuple of intensity values; and b. the arithmetic unit computes with subtraction:

(1) an intermediate result comprising an N-tuple of intensity values, each respective intermediate result intensity value independently responsive to a respective intensity value of the second operand and a respective intensity value of the third operand; and (2) the result, each respective result intensity value independently responsive to a respective intensity value of the first operand and a respective intensity value of the intermediate operand.

6. The printer of claim 1 wherein:

a. the register is further operative to store:

(1) a third operand comprising an N-tuple of intensity values; and (2) a prior result computed during a second cycle prior to the first cycle, the prior result comprising an N-tuple of intensity values;

b. the arithmetic unit computes the result in response to a first input and a second input; and c. the printer further comprises a multiplexer coupled between the register and the arithmetic unit, the multiplexer providing the first input and the second input responsive to two N-tuple intensity values stored in the register.

7. A printer that prints a pixel having an intensity, the printer comprising:

a. a pixel processor comprising:

(1) a register that stores a first operand, a second operand, and an intermediate operand, each operand comprising an N-tuple of intensity values; and (2) an arithmetic unit, coupled to the register, that computes with subtraction:

(a) in a first cycle, the intermediate operand in response to the first operand and the second operand; and (b) in a second cycle, a result in response to the intermediate operand, the result comprising an N-tuple of intensity values;

b. a memory comprising a page map;

c. a central processor that identifies a respective N-tuple of intensity values for the first operand and the second operand, and that updates the page map in response to the result; and d. a print engine, coupled to the memory, that prints the pixel with the intensity responsive to the page map.

8. The printer of claim 7 wherein:

a. the register further stores a color operand comprising an N-tuple of intensity values;

b. the pixel processor further comprises a first circuit that computes with subtraction a brush operand in response to the first operand and the color operand, the brush operand comprising an N-tuple of intensity values; and c. the arithmetic unit computes the intermediate operand in further response to the brush operand.

9. The printer of claim 8 wherein the first circuit comprises:

a. a subtracter that provides a respective carry-out signal responsive to a respective first operand intensity value and a respective color operand intensity value; and b. a multiplexer that provides each respective brush intensity value in response to the respective carry-out signal.

10. The printer of claim 7 wherein:

a. the pixel processor further comprises a first circuit that computes a transparency operand in response to the result and a source mask, the transparency operand comprising an N-tuple of intensity values, the source mask comprising an N-tuple of bits, the source mask identified by the central processor and stored in the register; and b. the central processor updates the page map in further response to the transparency operand.

11. The printer of claim 10 wherein:

a. the register further stores a pattern mask operand comprising an N-tuple of bits, the pattern mask operand being identified by the central processor; and b. the first circuit further computes the transparency operand in response to the pattern mask operand.

12. The printer of claim 7 wherein the central processor continues stored program execution during the first cycle.

13. The printer of claim 7 wherein:

a. the central processor identifies a command comprising a first opcode and a second opcode; and b. the arithmetic unit computes in response to the first opcode during the first cycle and computes in response to the second opcode during the second cycle.

14. The printer of claim 7 wherein:

a. the central processor identifies a command comprising an N-tuple of opcodes; and b. the arithmetic unit computes, during the first cycle, each respective intermediate intensity value in further response to the respective opcode of the command.

15. The printer of claim 7 wherein the pixel processor is characterized by a bit-slice architecture having a respective slice for computing a respective result intensity value.

16. The printer of claim 15 wherein each intensity value has at least 2 bits.

17. The printer of claim 15 wherein the arithmetic unit establishes a slice boundary in response to the central processor, one respective result intensity value comprising a plurality of bits adjacent to the respective slice boundary.

18. A printer that prints a pixel having an intensity, the printer comprising:

a. a register for storing a plurality of operands, each operand comprising a multiplicity of values in parallel format;

b. an arithmetic unit, coupled to the register, comprising:

(1) brush logic for providing a brush signal in response to a first and a second operand of the plurality of operands, the brush signal comprising a multiplicity of intensity values in parallel format;

(2) a first multiplexer for providing a first signal responsive to a selected operand of the plurality of operands, the first signal comprising a multiplicity of intensity values in parallel format;

(3) a first subtracter for providing a carry-out signal in response to the brush signal and the first signal;

(4) a second multiplexer for providing an intermediate operand in response to the first signal and to the carry-out signal, the intermediate operand for storage as an operand of the plurality of operands in the register; and (5) mask logic, coupled to the register, for providing a masked result in response to the intermediate operand, the masked result comprising a multiplicity of intensity values; and c. a print engine, coupled to the mask logic, that prints the pixel with the intensity responsive to an intensity value of the masked result.

19. The printer of claim 18 wherein the brush logic comprises:

a. a second subtracter for providing a second carry-out signal in response to the first operand and the second operand; and b. a third multiplexer for providing the brush signal in response to the second carry-out signal.

20. The printer of claim 18 wherein the mask logic is further responsive to an operand of the plurality of operands having a multiplicity of mask bits in parallel format.

* * * * *